Nov. 6, 1956

G. J. VACEK 2,769,382

CHOPPING DEVICE

Filed June 26, 1953

George J. Vacek
INVENTOR.

BY Ransler O Wyatt

ATTORNEY

Nov. 6, 1956   G. J. VACEK   2,769,382
CHOPPING DEVICE

Filed June 26, 1953   3 Sheets-Sheet 2

George J. Vacek
INVENTOR.

BY
ATTORNEY

Nov. 6, 1956 G. J. VACEK 2,769,382
CHOPPING DEVICE

Filed June 26, 1953 3 Sheets-Sheet 3

George J. Vacek
INVENTOR.

BY Ranseler O. Wyatt
ATTORNEY

United States Patent Office 2,769,382
Patented Nov. 6, 1956

2,769,382

CHOPPING DEVICE

George J. Vacek, Richmond, Tex.

Application June 26, 1953, Serial No. 364,314

4 Claims. (Cl. 97—10)

This invention relates to new and useful improvements in a crop chopping device.

It is an object of the invention to provide a device for use on tractors and the like for cultivating cotton, and similar crops, that are planted in solid rows and require thinning, which work is presently accomplished by hand, using hoes to cut the excess stalks of cotton and the grass in the row between the desired stalks.

It is still another object of this invention to provide a cotton chopper that will permit the operator to plow out entire portions of the rows being worked where there is no desired vegetation, such as cotton stalks, and that may be selectively put back into chopping relation when the desirable vegetation is again encountered.

It is still another object of this invention to provide a cotton chopping mechanism that may be converted into a cultivating plow that will plow out the grass in the row but will not harm the cotton or other desired vegetation.

It is still another object of the invention to provide an attachment for farm vehicles, such as a farm tractor, that will enable the operator to perform a varied selection of cultivating operations while the vehicle is in motion and while the operator remains seated on the vehicle seat.

With the above and other objects in view, the invention is more particularly defined in the following specifications and illustrated in the accompanying drawings, wherein.

Figure 1:
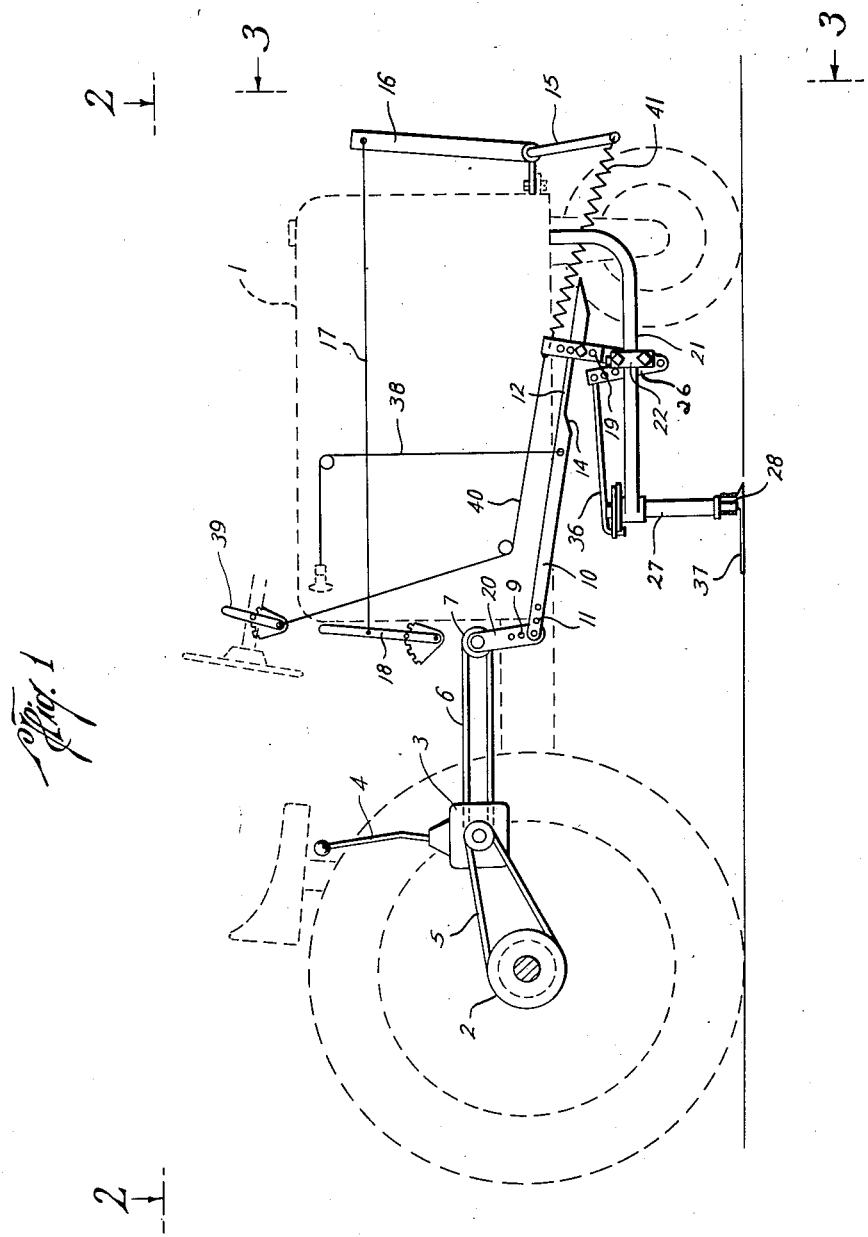
Figure 1 is a side elevational view, showing the device mounted on a tractor.
Figure 2:
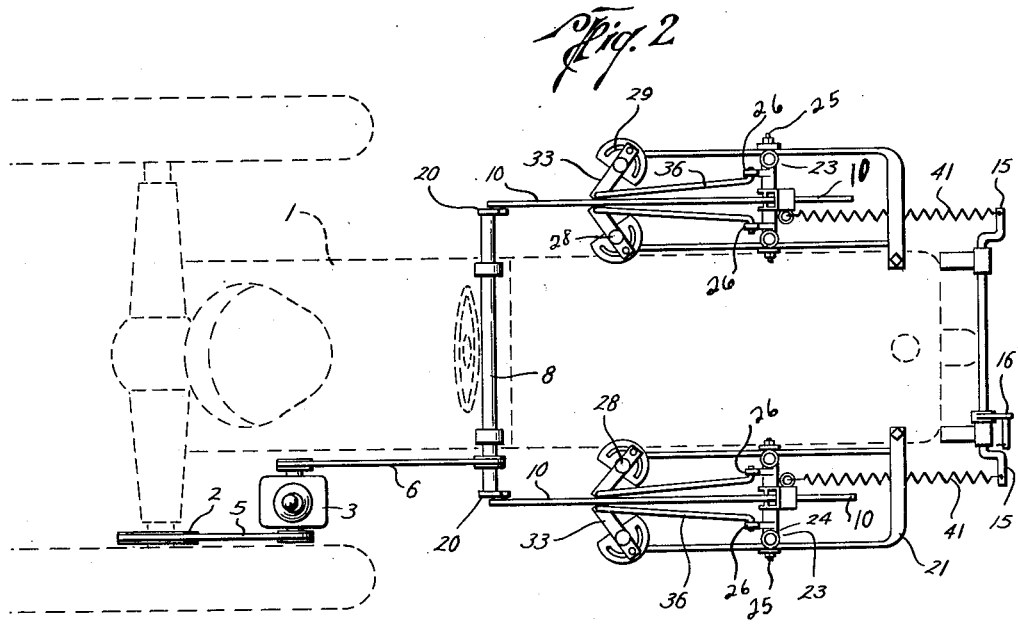
Figure 2 is a top plan view of the view shown in Figure 1.
Figure 3:
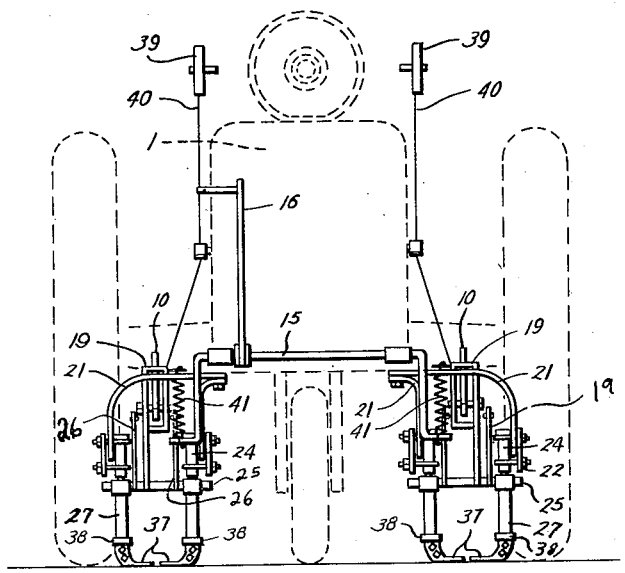
Figure 3 is a front view of the device as adapted for use on a farm tractor.
Figure 4:
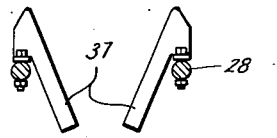
Figure 4 is a top view of the cutter blades in open position.
Figure 5:
Figure 5 is a top view of the cutter blades in closed position.
Figure 6:
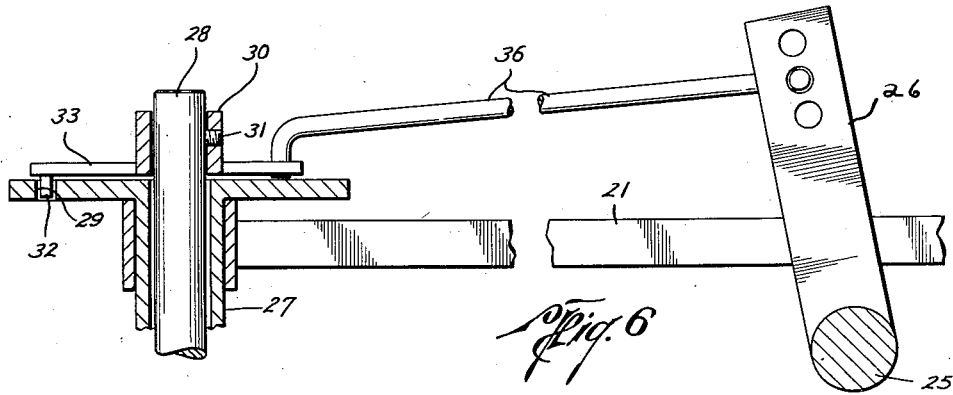
Figure 6 is a fragmentary side elevational view, partly in section, of the cutter blade shaft and its operating mechanism.
Figure 7:
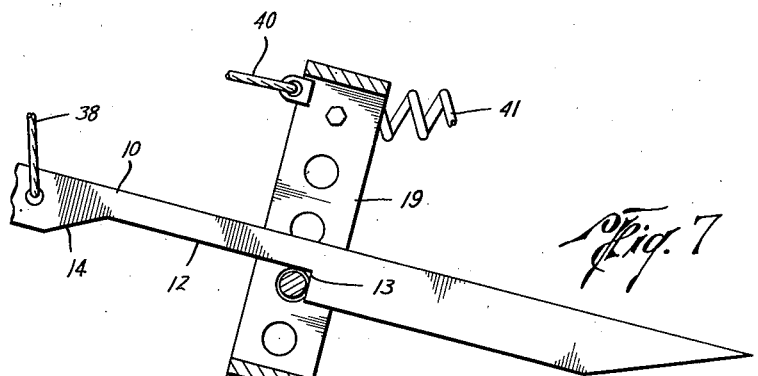
Figure 7 is a side elevation, partly in section, of the oscillating beam and bell crank.

Referring now more particularly to the drawings, the numeral 1 designates a wheeled vehicle, such as a farm tractor, on which a pulley 2 is secured to one of the wheels, preferably a rear wheel. A gear box 3 having the usual clutch mechanism and the control lever as 4, is mounted on the framework of the tractor adjacent the seat thereof and convenient to the hands of the operator. A belt, or chain, as 5 connects the pulley 2 with the gear box 3 and a belt, or chain, as 6, leads from the gear box 3 to the crank pulley 7 which rotates the pulley 7 and the crank shaft 8 attached thereto. The cranks 20, 20, one of which is mounted on each end of the shaft 8, have the series of adjusting apertures as 9 to receive the bolts which connect the oscillating beams 10, 10 to the cranks 20, 20. The beams 10, 10 also have the series of adjusting apertures as 11 to permit adjustment of the stroke of the beams 10, 10. The beams 10, 10 have the longitudinally reduced portion 12 forming a shoulder 13 at one end of said reduced portion and a tapered shoulder 14 at the other end of said reduced portion. The free ends of the beams are preferably tapered to permit easy movement into engaging position with the oscillating levers hereinafter described.

Pivotally mounted on the front of the vehicle is a tension bar 15 having a control lever 16 and a cable 17 leading from the lever 16 to a locking lever 18. The respective ends of the bar 15 are downwardly turned to form a crank and a tension means, such as the coiled springs 41, 41 are secured to each end of said bar 16 and the other ends of said coil springs are secured to the oscillating levers 19, 19, said levers having a series of apertures to selectively receive said springs. The levers 19, 19 are secured to the cultivator beams 21, 21 of the tractor by means of the plates 22, 22 which are welded, or otherwise secured as by means of eye bolts 23, which are welded to the housing 24.

The lower ends of the housings 24, 24 have a transverse port therethrough in which the axles 25, 25 are mounted. The levers 26, 26 are secured on the axles 25, 25, preferably one on each side of the oscillating levers 19, 19. Connecting rods 36, 36 are secured to the free end of said levers 26, 26, in which a series of apertures are provided for adjustment of the stroke. Mounted on the cultivator beams 21, 21 are the cutter blade shaft housings, as 27, 27, in which the cutter blade shafts, as 28, are mounted. The upper ends of the housings 27 are outwardly flared and grooved as at 29. Collars 30 are secured to the upper ends of the shafts 28, 28 as by an Allen screw 31. A transverse operating strap 33 is fixedly secured to said collar and a downwardly projecting stud as 32 on said strap 33 is received by the groove in said outwardly flared housing 27 and the stroke of the shaft 28 in the housing 27 is determined by the length of the said groove, the end of the groove stopping the return movement of the shaft 28, and the beams 10 riding the levers 19 for the balance of their forward stroke. Of course, suitable stops may be substituted, such as by securing suitable bolts at any desired place in said grooves, to further limit the return stroke of the cutter blades at any desired place in said grooves; an aperture in the opposing end of the strap 33 is provided to receive the connecting rod 36.

On the lower ends of the shafts 28, 28 are suitable cutter blades, as 37, which may be bolted, or otherwise secured to the said shafts 28. Suitable collars 38 may be provided to prevent the shafts 28 from upward movement in the housing 27.

As the vehicle proceeds along the rows of cotton, or other crop, the pulley 2 will turn the gears in the gear box 3 and which will in turn rotate the pulley 7 and shaft 8 which in turn rotates the cranks 20, 20, and which oscillates the beams 10, 10. The beams 10 engage the oscillating levers 19 which, on back stroke, moves the connecting rod 36 and the cutter blade shafts 28 and cutter blades 37 into open position and upon return stroke, the springs 25, 25, draw the levers 19 and connecting rod 36 and cutter blade shafts 28 and cutter blades 37 into closed position. The tension on the levers 19 will be adjusted by the operator through the locking lever 18, such as where a particular thick row of grass is encountered requiring a strong return stroke. When it is desired to stop the chopping action of the cutter blades 37 on either or both sides of the machine, and maintain the blades in closed position such as when it is desired to plow an entire row of grass or the like, the cable 38, which is secured to the oscillating beam 10 may be utilized to manually lift the beam 10 out of engagement with the lever 19, and the cable 38 may be released to permit the beam 10 to again engage the lever 19 when it is desired to resume the chopping action. When it is desired to skip a portion of the row, on either or both sides of the tractor, the levers 39, 39 may be selectively utilized to move the lever 19 rearwardly through the cable 40 and maintain same, against the tension of the spring 25, moving and holding the cutter blades 37 in open position. When it is desired to resume chopping action, the lever 19 may be released and it will again be brought into engagement with the beam 10 and the chopping action resumed.

Where it is desired to cultivate cotton, or similar crops, after they have reached a fairly sturdy growth, the ends of the cutter blades are dulled and the beam 10 disconnected as hereinabove described, and the springs 41 are moved from the levers 19, 19 to the straps 33, a suitable yoke (not shown) may be employed to join both of the cutter blade shafts to one spring. The blades will thus be maintained yieldably in closed position, and the row cultivated with the dulled ends of the blades contacting the cotton stalks and yielding to plow around them, thus cutting the grass from the row without harming the stalks.

While the foregoing is considered a preferred form of the invention, it is by way of illustration only, and the broad principle of the invention will be defined by the appended claims.

What I claim is:

1. In a cotton chopping device, a wheeled vehicle, a pair of cutting blades reciprocably mounted on each side of said vehicle having means whereby said blades are reciprocated by the rotation of the wheels of said vehicle as it progresses, comprising a pair of cutter shaft housings fixedly mounted on said vehicle, cutter shafts loosely mounted in said housing, cutter blades detachably mounted on one end of said cutter shafts, a connecting rod having one end connected to the wheel operated reciprocating means, a collar secured to the other end of said shafts and means on said collar for receiving the other end of said connecting rod, adjustable stop means on said collar limiting the return stroke of said cutter blades.

2. In a cotton chopper, a wheeled vehicle, a reciprocating beam mounted on said vehicle, a means for imparting movement to said beam, a bell crank pivotally secured to said vehicle, means for constantly urging said bell crank into one position and means on said beam for contacting said bell crank and moving same in the other direction, a pair of cutting blades mounted on said vehicle and a connecting rod between said bell crank and said cutting blades for oscillating said cutting blades, and means for selectively moving said beam into and out of operating connection with said bell crank while the chopper is in operation.

3. In a cotton chopper, a wheeled vehicle, a reciprocating beam mounted on said vehicle, a means for imparting movement to said beam, a bell crank pivotally secured to said vehicle, means for constantly urging said bell crank into one position and means on said beam for contacting said bell crank and moving same in the other direction, a pair of cutting blades mounted on said vehicle and a connecting rod between said bell crank and said cutting blades for oscillating said cutting blades and means for seelctively moving said bell crank into and out of operative connection with said beam while the chopper is in operation.

4. In a cotton chopper attachment for a tractor, a gear rotated by said tractor, a crank shaft rotated by said gear, a plurality of reciprocating beams in connection with said crank shaft, bell cranks adapted to be operated by said beams and having connecting rods extending therefrom, cutter blades pivotally mounted on the tractor in connection with said rods, a pivotally mounted spring bar on the front of said tractor, yieldable means having one end connected to one end of said bar and the other end connected to the said bell cranks, and the other end of said bar having a control cable secured thereto for adjusting the position of said bar and the tension on said yieldable means.

References Cited in the file of this patent
UNITED STATES PATENTS

| | | |
|---|---|---|
| 74,519 | Doolittle et al. | Feb. 18, 1868 |
| 349,076 | Basham | Sept. 14, 1886 |
| 797,875 | Sugg et al. | Aug. 22, 1905 |
| 882,409 | McCaleb | Mar. 17, 1908 |
| 952,983 | Doty | Mar. 22, 1910 |
| 1,086,905 | Dinse | Feb. 10, 1914 |
| 1,270,453 | Smith | June 25, 1918 |
| 1,319,412 | Nichols | Oct. 21, 1919 |
| 1,593,941 | Langford | July 27, 1926 |
| 2,706,437 | Sanders | Apr. 19, 1955 |